United States Patent
Deng et al.

(10) Patent No.: US 8,660,059 B2
(45) Date of Patent: Feb. 25, 2014

(54) METHOD AND SYSTEM FOR MANAGING STATES OF RELAY NODE

(75) Inventors: Yun Deng, Shenzhen (CN); Si Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,353

(22) PCT Filed: Jan. 21, 2011

(86) PCT No.: PCT/CN2011/070491
§ 371 (c)(1),
(2), (4) Date: Jul. 27, 2012

(87) PCT Pub. No.: WO2011/097980
PCT Pub. Date: Aug. 18, 2011

(65) Prior Publication Data
US 2012/0281614 A1 Nov. 8, 2012

(30) Foreign Application Priority Data

Feb. 9, 2010 (CN) .......................... 2010 1 0125710

(51) Int. Cl.
*H04B 7/14* (2006.01)
(52) U.S. Cl.
USPC ........... 370/315; 370/274; 370/294; 370/327; 455/7; 455/63.1; 455/434
(58) Field of Classification Search
USPC .................. 370/274, 275, 293.294, 295, 315, 370/327–329; 455/7, 63.1, 434
See application file for complete search history.

(56) References Cited

U.S. PATENT DOCUMENTS

| | | | | |
|---|---|---|---|---|
| 6,785,510 | B2 * | 8/2004 | Larsen ......................... | 455/11.1 |
| 7,349,665 | B1 * | 3/2008 | Zhu et al. ..................... | 455/11.1 |
| 7,386,036 | B2 * | 6/2008 | Pasanen et al. ............... | 375/211 |
| 7,577,124 | B2 * | 8/2009 | Yomo et al. ................... | 370/338 |
| 8,145,271 | B2 * | 3/2012 | Ishii .............................. | 455/561 |
| 8,260,206 | B2 * | 9/2012 | Damnjanovic ............... | 455/63.1 |
| 8,265,046 | B2 * | 9/2012 | Kuokkanen .................. | 370/338 |
| 8,274,924 | B2 * | 9/2012 | Cai et al. ...................... | 370/315 |
| 8,311,061 | B2 * | 11/2012 | Yu et al. ........................ | 370/474 |
| 8,335,466 | B2 * | 12/2012 | Cai et al. ........................... | 455/7 |

(Continued)

FOREIGN PATENT DOCUMENTS

CN 101932103 A 12/2010

OTHER PUBLICATIONS

International Search Report in international application No. PCT/CN2011/070491, mailed on May 5, 2011.

(Continued)

*Primary Examiner* — Andrew Lai
*Assistant Examiner* — Andrew C Lee
(74) *Attorney, Agent, or Firm* — Oppedahl Patent Law Firm LLC

(57) ABSTRACT

The disclosure discloses a method and a system for managing a state of a relay node. The method comprises switching (23) the state of the relay node from a connection state of serving as a user equipment to a connection state of enabling a relay function, after the relay node acquires (21) information that a base station schedules the relay node through a relay-node physical downlink control channel, or after the relay node sends (22) the base station a state-switching request of requiring to switch to the connection state of enabling a relay function.

16 Claims, 2 Drawing Sheets

(56) References Cited

U.S. PATENT DOCUMENTS

| | | | |
|---|---|---|---|
| 2004/0063451 A1* | 4/2004 | Bonta et al. | 455/519 |
| 2007/0153734 A1* | 7/2007 | Lee et al. | 370/329 |
| 2007/0155315 A1* | 7/2007 | Lee et al. | 455/11.1 |
| 2009/0156225 A1* | 6/2009 | Angelow et al. | 455/450 |
| 2009/0313518 A1* | 12/2009 | Shen et al. | 714/749 |
| 2010/0120442 A1* | 5/2010 | Zhuang et al. | 455/450 |
| 2010/0195586 A1* | 8/2010 | Choi et al. | 370/329 |
| 2010/0238845 A1* | 9/2010 | Love et al. | 370/280 |
| 2010/0279628 A1* | 11/2010 | Love et al. | 455/70 |
| 2011/0164541 A1* | 7/2011 | Cai et al. | 370/312 |
| 2011/0164542 A1* | 7/2011 | Cai et al. | 370/312 |
| 2011/0164577 A1* | 7/2011 | Cai et al. | 370/329 |
| 2011/0170496 A1* | 7/2011 | Fong et al. | 370/329 |

OTHER PUBLICATIONS

English Translation of the Written Opinion of the International Search Authority in international application No. PCT/CN2011/070491, mailed on May 5, 2011.

Considerations on the random access procedure of relay node Jun. 29-Jul. 3, 2009.

States definition for relay node Jan. 18-22, 2010.

* cited by examiner

METHOD AND SYSTEM FOR MANAGING STATES OF RELAY NODE

TECHNICAL FIELD

The disclosure relates to the field of mobile communications, and in particular to a method and system for managing the state of a Relay Node (RN).

BACKGROUND

To meet the increasing demands of high-bandwidth, high-speed mobile access, the Third Generation Partnership Projects (3GPP) puts forward a Long-Term Evolution Advanced (LTE-Advanced) standard. The LTE-Advanced maintains the core of the original LTE system, but has evolved to expand frequency domain and space domain through a series of technologies. The LTE-Advanced improves frequency spectrum utilization rate, increases system capacity, and the like. The Radio Relay technology is one of the technologies in the LTE-Advanced, which aims to expand cell coverage area, reduce communication uncovered area, balance load, forward services at hot spots, and save transmission power of User Equipment (UE), i.e., a terminal. As shown in FIG. 1, new RNs are added between an original base station (Donor-eNB) and UE. The RNs are connected with the base station over radio, wherein the radio links between the Donor-eNB and the RNs are called backhaul links, and the radio links between the RNs and the UE are called access links. Downlink data is transmitted first to the base station, then to the RNs, and finally to the UE, while uplink data is transmitted in a reverse order.

To configure the resources of the backhaul link, the Relay-node Physical Downlink Control Channel (R-PDCCH), Relay-node Physical Downlink Shared Channel (R-PDSCH) and Relay-node Physical Uplink Shared Channel (R-PUSCH) are defined. The R-PDCCH resources may be part of Physical Resource Blocks (PRB) in the subframe for the downlink transmission of the backhaul link, or they may be part or all of OFDM signals in the subframe for the downlink transmission of the backhaul link. A base station dynamically or semi-statically allocates R-PDSCH and R-PUSCH resources for an RN through the R-PDCCH, wherein the R-PDSCH resources are used for transmitting the downlink data of the backhaul link, and the R-PUSCH resources are used for transmitting the uplink data of the backhaul link. An RN can monitor the downlink assignment (i.e., PDSCH resources), uplink grant (i.e., PUCCH and/or PUSCH resources) and the like indicated by a base station on the PDCCH, and implement the data transmission between itself and the base station on the corresponding PDSCH and PUSCH. The RN can also monitor the downlink assignment (i.e., R-PDSCH resources), uplink grant and the like indicated by a base station on the R-PDCCH, and implements the transmission between itself and base station on the corresponding R-PDSCH and R-PUSCH. Moreover, the RN indicates the downlink assignment, uplink grant and the like on the PDCCH of an access link, and implements the transmission between itself and a UE on the corresponding PDSCH and PUSCH, so as to avoid the conflict between the transmission between itself and the base station and that between itself and the UE.

The RN can be in one of the following states:

Idle State:

The RN is in an idle state when is initially powered-on or after the radio links fail to be re-set up. When in an idle state, the RN has completely or partially same functions as that of a UE in an idle state, such as a system information acquisition function, a measurement function, a cell selection/reselection function and the like.

Connection State of Serving as a UE:

The RN has completely or partially the same functions as that of the UE in the connection state when in the connection state of serving as a UE, such as a system information acquisition function, a measurement function, a reporting function, a switching function, a function of transmitting data between a base station and an RN by a PDCCH and a PDSCH or PUSCH, and other functions. The RN does not have a relay function when in the connection state of serving as a UE, i.e., it is incapable of allowing a UE to access the network via RN.

Connection State of Enabling a Relay Function:

The RN has the relay function when in such state, i.e., it has the relay function of transmitting data between itself and the base station, and between itself and a UE managed thereby. Specifically, between the base station and the RN, the relay function includes a system information acquisition function, a measurement function, a measurement reporting function, a switching function, a function of transmitting data by an R-PDCCH and an R-PDSCH or R-PUSCH, and other functions. The RN can also manage cells belonging thereto, as well as UEs in the cells, when in the connection state of enabling a relay function. Between the RN and the UE, the relay function includes the functions of sending the system information of the RN, managing the measurement process and the switching process of the UE, transmitting data between the RN and the UE by a PDCCH and a PDSCH/PUSCH, and other functions.

The RN can switch from an idle state to the connection sate of the UE via a radio resource control (RRC) connection setup process, and can switch from the connection state of serving as a UE to the idle state via an RRC connection releasing process.

The state accessing process of the RN includes the following contents:

(1) After the RN is initially power-on, cell search is implemented, and a cell in the Donor-eNB is selected to read the system information thereof, wherein the RN is in an idle state at that moment. The main function of the RN is to provide services for the UEs within its coverage area, so the time when the RN is in an idle state is very short.

(2) The RN selects a random access preamble according to the random access resources in system information, initiates a random access, and sets up an RRC connection, and then a network side authenticates and encrypts the RN and configures a Data Radio Bearer (DRB) which is used for data transmission for the RN by RRC connection reconfiguration after the success of the authentication and the encryption. In the process, once the random access is initiated successfully, the RN is in the connection state of serving as a UE, and needs to monitor the PDCCH sent by the base station and detect its own PDCCH and/or the PDSCH in the same subframe according to the Radio Network Temporary Identifier (RNTI), including Cell RNTI, SPS RNTI and the like, allocated thereto by the base station. The RN can notify the base station of the information that what is accessed is the RN rather than an ordinary UE through an air interface signalling, and acquire the RN access information by the authentication of the RN through a core network or through an Operation & Maintenance (O&M) system.

(3) After the DRB is set up in the RN, the O&M system transmits configuration data to the RN so that the RN can perform the relay function and provide services for the UEs within its coverage area. The downloaded configuration data includes the parameter information for configuring its own system information by the RN, such as a tracking area code, a cell identity, and a cell selection/reselection parameter. The downloaded configuration data may also include the configuration parameters required by the RN in the connection state of enabling a relay function, such as R-PDCCH configuration information, R-PDSCH configuration information, R-PUSCH configuration information, the dedicated scheduling request configuration information for the RN, subframe information for scheduling the RN (corresponding to the fake MBSFN subframe of an access link), and specific identity of the RN. After acquiring such configuration information, the RN initiates the required parameters to prepare for providing cell services by the relay functions. The RN also initiates the related counters and state variables, as well as rationally configures the system information of the provided cells, and the like.

When the access link and the backhaul link share the same frequency band, on one hand, the RN must maintain connection (the uplink data exchange and downlink data exchange in the backhaul link) with a Donor-eNB, on the other hand, it must maintain connection (the uplink data exchange and downlink data exchange in the access link) with a UE, thus creating a conflict in the processing of the RN. To resolve the conflict, a Fake Multicast Broadcast Single Frequency Network (Fake MBSFN) subframe is introduced. In the Fake MBSFN subframe, the RN exchanges data with the base station without sending a signal to a UE in the access link, and broadcasts the Fake MBSFN subframe information so that the UE does not monitor signals transmitted by the RN in the subframe. When the RN is in the connection state of enabling a relay function within the Fake MBSFN subframe, the base station schedules the RN through the R-PDCCH, but there is no effective solution in the prior art for how to actively change the RN from the initial connection state of serving as a UE to a normal working state (or the connection state of enabling a relay function). One simple solution is that the base station specially controls the state changes of the RN via a dedicated signalling. However, such solution requires the modification on the interface signalling of the existing protocol, and also fails to consider the processing time delay in the local parameters configuration of the RN, so it is necessary to provide a new solution.

SUMMARY

The technical problem to be solved by the disclosure is to provide a method and system for managing the state of an RN, to control the state of the RN by a base station and improve the system performance based on compatibility with the existing protocol.

In order to solve the problem, the disclosure provides a method for managing the state of the RN, which includes switching the state of the RN from a connection state of serving as a UE to a connection state of enabling a relay function, after the RN acquires information that a base station schedules the RN through a Relay-node Physical Downlink Control Channel (R-PDCCH), or after the RN sends the base station a state-switching request of requiring to switch to the connection state of enabling a relay function.

The method may further include that:
the base station takes a moment of acquiring that the RN switches to the connection state of serving as a UE as an initial point, and, after a time period set by a system or a default time period, schedules the RN through the R-PDCCH.

Further, the RN detects the R-PDCCH automatically, and acquires the information that the base station schedules the RN through the R-PDCCH when R-PDCCH information from the base station to the RN is detected.

The method may further include that:
the base station schedules the RN through the R-PDCCH after receiving the state-switching request; or
the base station schedules the RN through the R-PDCCH and returns a state-switching request response message to the RN, after receiving the state-switching request; or
the base station schedules the RN through the R-PDCCH, after receiving the state-switching request and returning a state-switching request response message to the RN; or
the base station schedules the RN through the R-PDCCH at a moment indicated by starting time information included in the state-switching request after receiving the state-switching request, wherein the starting time information indicates the moment at which the base station schedules the RN through the R-PDCCH.

Further, the RN acquires the information that the base station schedules the RN through the R-PDCCH when receiving the state-switching request response message from the base station.

Further, the RN acquires the information that the base station schedules the RN through the R-PDCCH when receiving part or all of relay function configuration parameters from the base station.

The method may further include that:
after sending the relay function configuration parameters to the RN, the base station schedules the RN through the R-PDCCH.

Further, the relay function configuration parameters include one or more of the following parameters: R-PDCCH configuration information, Relay-node Physical Downlink Shared Channel (R-PDSCH) configuration information, Relay-node Physical Uplink Shared Channel (R-PUSCH) configuration information, dedicated scheduling request configuration information for the RN, subframe information for scheduling the RN, and RN identity.

The method may further include that:
the RN monitors PDCCH information from the base station when the RN is in the connection state of serving as a UE.

The method may further include that:
the RN monitors the R-PDCCH information from the base station when the RN is in the connection state of enabling a relay function.

In order to solve the problem, the disclosure further provides a system for managing a state of a Relay Node (RN), which includes a base station and an RN. The RN is configured to switch from a connection state of serving as a UE to a connection state of enabling a relay function, after acquiring information that the base station schedules the RN through a Relay-node Physical Downlink Control Channel (R-PDCCH), or after sending the base station a state-switching request of requiring to switch to the connection state of enabling a relay function.

Further, the base station is configured to take the moment of acquiring that the RN switches to the connection state of serving as a UE as an initial point, and, after a time period set by a system or a default time period, schedule the RN through the R-PDCCH, and
the RN is further configured to automatically detect the R-PDCCH, and acquire the information that the base station schedules the RN through the R-PDCCH when R-PDCCH information from the base station to the RN is detected.

Further, the base station may be configured to:
after receiving the state-switching request from the RN, the base station is configured to schedule the RN through the R-PDCCH; or, after receiving the state-switching request from the RN, the base station is configured to schedule the RN through the R-PDCCH and return a state-switching request response message to the RN; or after receiving the state-switching request and returning a state-switching request response message to the RN, the base station is configured to schedule the RN through the R-PDCCH; or the base station is configured to parse the received state-switching request to acquire starting time information, and schedule the RN through the R-PDCCH at a moment indicated by the starting time information, and return a state-switching request response message to the RN after starting to schedule the RN through the R-PDCCH.

The RN may further be configured to include starting time information in the state-switching request sent to the base station, which indicates a moment at which the base station schedules the RN through the R-PDCCH, or acquire that the base station schedules the RN through the R-PDCCH when receiving the state-switching request response message.

Further, the base station may be configured to schedule the RN through the R-PDCCH after sending relay function configuration parameters to the RN; and the RN may be further configured to acquire the information that the base station schedules the RN through the R-PDCCH when receiving part or all of the relay function configuration parameters from the base station.

In the disclosure, based on compatibility with the existing protocol, the state of the RN is controlled by the base station; the starting time when the base station schedules the RN through the R-PDCCH is determined, and the RN is controlled to switch the state of the RN from a connection state of serving as a UE to a connection state of enabling a relay function. The disclosure makes a small change on the existing protocol, and is simple to implement and flexible to configure.

DETAILED DESCRIPTION

Figure 1:
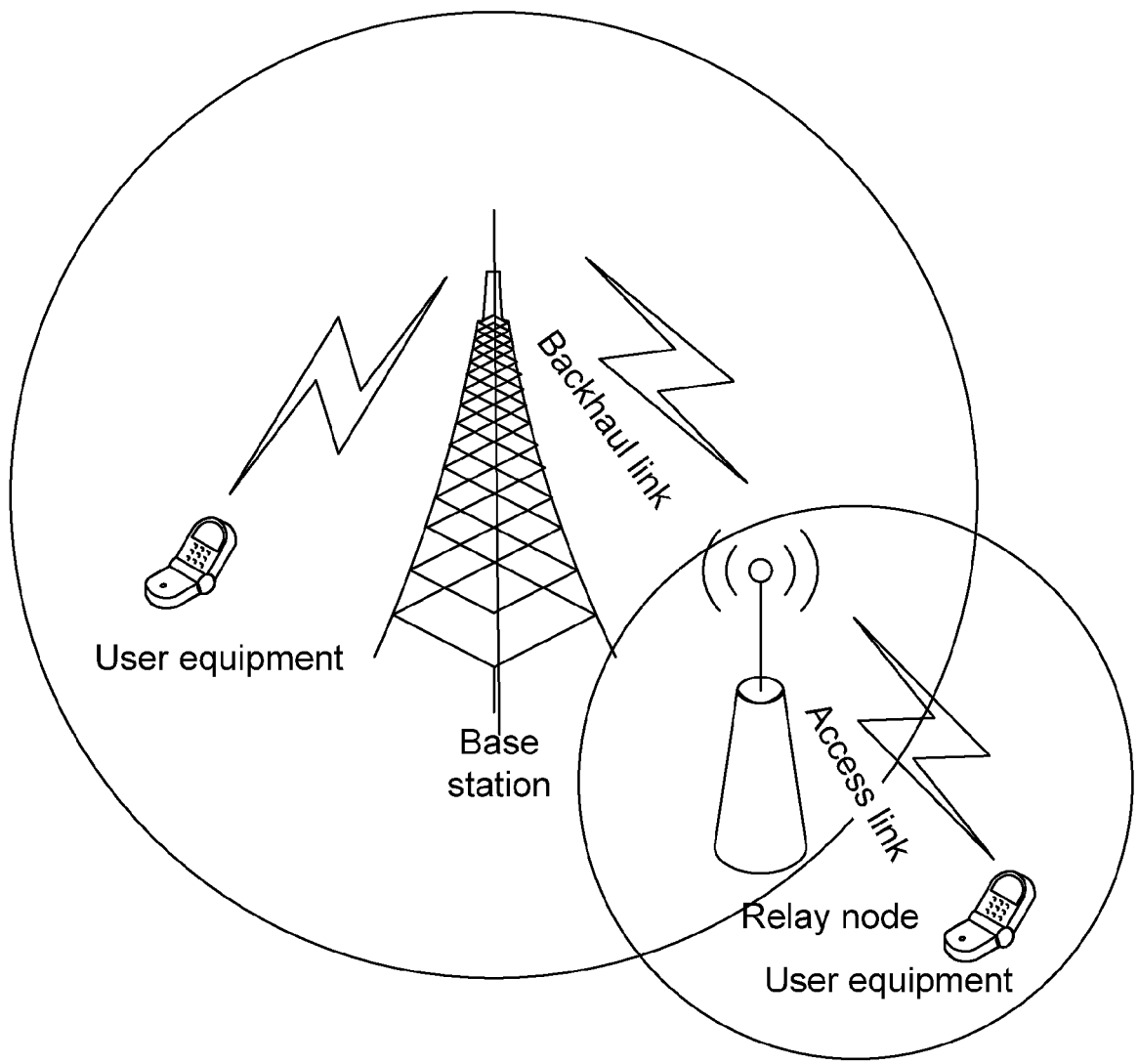
FIG. 1 is a diagram showing the structure of a system adopting the radio relay technology in the prior art.

The system for managing the state of the RN includes a base station and an RN. The RN monitors the PDCCH information from the base station when in the connection state of serving as a UE, and monitors the R-PDCCH information from the base station when in the connection state of enabling a relay function. The RN is used for switching the state of the RN from a connection state of serving as a UE to a connection state of enabling a relay function after acquiring the information that the base station schedules the RN through the R-PDCCH or after sending the base station a state-switching request of requiring to switch to the connection state of enabling a relay function.

In the first embodiment, the base station takes the moment of acquiring that RN switches to the connection state of serving as a UE as the initial point, and after a time period set by the system or a default time period, the base station starts to schedule the RN through the R-PDCCH.

The RN is used for automatically detecting the R-PDCCH, acquiring the information that the base station schedules the RN through the R-PDCCH when the R-PDCCH information from the base station to the RN is detected, and switching the state of the RN from a connection state of serving as a UE to a connection state of enabling a relay function.

In the second embodiment, after receiving the state-switching request from the RN, the base station is used for scheduling the RN through the R-PDCCH, or, after receiving the state-switching request from the RN, scheduling the RN through the R-PDCCH and returning a state-switching request response message to the RN, or, after receiving the state-switching request and returning the state-switching request response message to the RN, scheduling the RN through the R-PDCCH.

The RN is used for acquiring the information that the base station schedules the RN through the R-PDCCH when receiving the state-switching request response message and switching the state of the RN from a connection state of serving as a UE to a connection state of enabling a relay function.

In another implementation of the second embodiment, the RN is used for including the starting time information in the state-switching request sent to the base station, which indicates a moment at which the base station schedules the RN through the R-PDCCH. The base station is used for parsing the received state-switching request to acquire the starting time information, scheduling the RN through the R-PDCCH at a moment indicated by the starting time information, and returning a state-switching request response message to the RN. The RN is further used for acquiring the information that the base station schedules the RN through the R-PDCCH when receiving the state-switching request response message, and switching the state of the RN from a connection state of serving as a UE to a connection state of enabling a relay function.

In the third embodiment, the base station is used for scheduling the RN through the R-PDCCH after sending relay function configuration parameters to the RN.

The RN is used for acquiring the information that the base station schedules the RN through the R-PDCCH when receiving part or all of the relay function configuration parameters from the base station, and switching the state of the RN from a connection state of serving as a UE to a connection state of enabling a relay function.

The relay function configuration parameters include one or more of the following parameters: R-PDCCH configuration information, R-PDSCH configuration information, R-PUSCH configuration information, dedicated scheduling request configuration information for the RN, subframe information for scheduling the RN, and RN identity.

Figure 2:
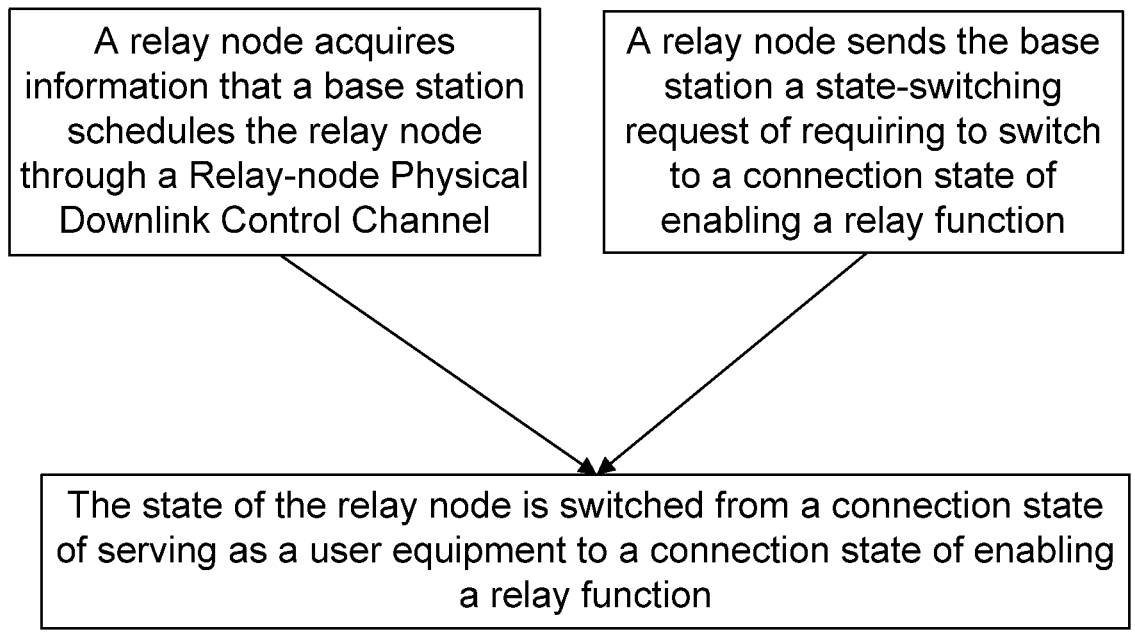
FIG. 2 is a diagram showing a method for managing the state of an RN in one embodiment.

As shown in FIG. 2, the method for managing the state of the RN includes that: the RN switches the state of the RN from a connection state of serving as a UE to a connection state of enabling a relay function, after acquiring the information that the base station schedules the RN through the R-PDCCH or sending the base station a state-switching request of requiring to switch to the connection state of enabling a relay function.

The method is described below with reference to multiple embodiments in detail.

First Embodiment

The method for managing the state of the RN includes the following steps:

S101: The base station takes the moment of acquiring that the RN switches to the connection state of serving as a UE as an initial point, and, after a time period set by the system or a default time period, starts to schedule the RN through the R-PDCCH.

Different RNs have different processing capabilities, and may provide different coverage areas and be applied to different scenarios, so the specific initialization completion time for the RNs may be quite different. The time period set by the system or the default time period is generally an empirical value and the time required to complete initialization by RNs.

S102: The RN automatically detects the R-PDCCH, acquires the information that the base station schedules the RN through the R-PDCCH when the R-PDCCH information from the base station to the RN is detected (the base station configures different identities for different RNs), and switches from the connection state of serving as a UE (monitoring the PDCCH) to the connection state of enabling a relay function (monitoring the R-PDCCH).

After initialization is completed, the RN can monitor the PDCCH and the R-PDCCH at the same time. After downloading the required configuration (including the configuration information of the Fake MBSFN and the R-PDCCH configuration information) from the O&M system, different from ordinary UEs, the RN will not initiate such required services as the VOIP and internet service, so the RN only need to monitor the R-PDCCH, and will switch the state of the RN from a connection state of serving as a UE to a connection state of enabling a relay function once automatically detecting the R-PDCCH information for the RN. If no R-PDCCH information sent the RN is detected, the RN continues to detect the PDCCH information.

Before automatically detecting the R-PDCCH, the RN has acquired relay function configuration parameters from the base station or the O&M system. The relay function configuration parameters can be also sent to the RN by the Donor-eNB through an air interface signalling, such as an RRC connection reconfiguration. The relay function configuration parameters include one or more of the following parameters: R-PDCCH configuration information, R-PDSCH configuration information, R-PUSCH configuration information, dedicated scheduling request configuration information for the RN, subframe information for scheduling the RN (corresponding to the fake MBSFN subframe of an access link), and RN identity (or RN Radio Network Temporary Identifier (RN-RNTI)).

S103: The RN sends information to the base station in the uplink grant indicated by the R-PDCCH, or directly returns acknowledgement information to the base station (through the air interface signalling, such as RRC signalling, and MAC layer control signalling) to notify the base station that the RN has switched to the connection state of enabling a relay function. Then, the base station schedules the RN through the R-PDCCH; and the RN provides services for the UEs within its coverage area.

Second Embodiment

The method for managing the state of the RN includes the following steps:

S201: The RN sends the base station a state-switching request of requiring to switch to the connection state of enabling a relay function.

The RN may send the state-switching request of requiring to switch to the connection state of enabling a relay function to the base station after initialization of the RN is completed.

Before sending the state-switching request, the RN has acquired relay function configuration parameters from the base station or the O&M system. The relay function configuration parameters can be also sent to the RN by the Donor-eNB through an air interface signalling, such as an RRC connection reconfiguration. The relay function configuration parameters include one or more of the following parameters: R-PDCCH configuration information, R-PDSCH configuration information, R-PUSCH configuration information, dedicated scheduling request configuration information for the RN, subframe information for scheduling the RN (corresponding to the fake MBSFN subframe of an access link), and RN identity (or RN-RNTI).

S202: After receiving the state-switching request from the RN, the base station schedules the RN through the R-PDCCH and returns a state-switching request response message to the RN.

Or, in another implementation, the RN includes the starting time information in the state-switching request sent to the base station for indicating the moment at which the base station schedules the RN through the R-PDCCH. The base station parses the received state-switching request to acquire the starting time information and starts to schedule the RN through the R-PDCCH at the moment indicated by the starting time information. The starting time information can be either absolute time or relative time information. For example, the request contains 10 ms delay information (relative time); and after receiving the request, the base station schedules the RN through the R-PDCCH at the tenth millisecond, or schedules the RN through the R-PDCCH once 10 milliseconds elapse. Thereafter, the base station schedules the RN through the R-PDCCH all the time; and the RN provides services for the UEs within its coverage area at the same time.

S203: The RN acquires the information that the base station schedules the RN through the R-PDCCH when the state-switching request response message is received, switches the state of the RN from a connection state of serving as a UE to a connection state of enabling a relay function and starts to detect the R-PDCCH.

In other implementations of the second embodiment, the base station schedules the RN through the R-PDCCH after receiving the state-switching request from the RN, and no state-switching request response message is returned to the RN; or, after receiving the state-switching request from the RN and returning the state-switching request response message to the RN, the base station schedules the RN through the R-PDCCH.

Third Embodiment

The method for managing the state of the RN includes the following steps:

S301: The base station schedules the RN through the R-PDCCH after sending relay function configuration parameters to the RN.

The base station configures the relay function configuration parameters and sends them to the RN through an air interface signalling, such as an RRC signalling. The relay function configuration parameters include one or more of the following parameters: R-PDCCH configuration information, R-PDSCH configuration information, R-PUSCH configuration information, dedicated scheduling request configuration information for the RN, subframe information for scheduling the RN (corresponding to the fake MBSFN subframe of an access link), and RN identity (or RN-RNTI).

S302: The RN acquires the information that the base station schedules the RN through the R-PDCCH when receiving part or all of the relay function configuration parameters from the base station, and switches the state of the RN from a connection state of serving as a UE to a connection state of enabling a relay function.

The embodiment adopts a default configuration manner, i.e., once the RN has acquired part or all of specific configuration parameters of the RN through an air interface signalling, the RN starts to monitor the R-PDCCH. The RN needs to provide services for the UEs within its coverage area, so the RN has to set up an S1 interface with a core network via the base station. The RN sends an S1 setup request to the base station, then the base station sends base station configuration update to the core network to notify the core network of the change of the S1 interface. The core network sends the base station configuration update acknowledgement to the base station and then the base station sends an S1 Setup Response to the RN. According to the same processing method in the embodiment, after receiving the S1 setup response from the base station (before this, the base station schedules the RN through the PDCCH), the RN starts to monitor the R-PDCCH and switch the state of the RN from a connection state of serving as a UE to a connection state of enabling a relay function. Thereafter, the RN keeps connection with the base station and provides services for the UEs within its coverage area.

Besides, the RN can also switch the state of the RN from a connection state of serving as a UE to a connection state of enabling a relay function when receiving a specific signalling from the base station.

Of course, the disclosure also has various other embodiments, and various corresponding changes and modifications may be made by those skilled in the art within the spirit and essence of the disclosure, but those changes and modifications should be deemed to be included within the protection scope of the appended claims of the disclosure.

INDUSTRIAL APPLICABILITY

In the disclosure, on the basis of compatibility with the existing protocol, the state of the RN is controlled by the base station; the starting time when the base station schedules the RN through the R-PDCCH is determined, and the RN is controlled to switch the state of the RN from a connection state of serving as a UE to a connection state of enabling a relay function. The disclosure makes a small change on the existing protocol, and is simple to implement and flexible to configure.

The invention claimed is:

1. A method for managing a state of a Relay Node (RN), comprising:
    switching a state the an RN in a connection state of serving as a User Equipment (UE) to a connection state of enabling a relay function, after the RN in the connection state of serving as a UE acquires information that a base station schedules the RN through a Relay-node Physical Downlink Control Channel (R-PDCCH), or after the RN in the connection state of serving as a UE sends the base station a state-switching request of requiring to switch to the connection state of enabling a relay function;
    wherein, the connection state of serving as a UE is a state in which the RN has no relay function; and
    the connection state of enabling a relay function is a state in which the RN has a relay function and provides services for a UE within a covering area of the RN.

2. The method according to claim 1, further comprising:
    taking, by the base station, a moment of acquiring that the RN switches to the connection state of serving as a UE as an initial point, and, after a time period set by a system or a default time period, scheduling the RN through the R-PDCCH.

3. The method according to claim 2, wherein the acquiring information that the base station schedules the RN through the R-PDCCH comprises:
    detecting, by the RN, the R-PDCCH automatically; and
    acquiring the information that the base station schedules the RN through the R-PDCCH when R-PDCCH information from the base station to the RN is detected.

4. The method according to claim 1, wherein the acquiring information that the base station schedules the RN through the R-PDCCH comprises:
    detecting, by the RN, the R-PDCCH automatically; and
    acquiring the information that the base station schedules the RN through the R-PDCCH when R-PDCCH information from the base station to the RN is detected.

5. The method according to claim 1, further comprising:
    scheduling, by the base station, the RN through the R-PDCCH after receiving the state-switching request; or
    scheduling, by the base station, the RN through the R-PDCCH and returning a state-switching request response message to the RN, after receiving the state-switching request; or
    scheduling, by the base station, the RN through the R-PDCCH, after receiving the state-switching request and returning a state-switching request response message to the RN; or
    scheduling, by the base station, the RN through the R-PDCCH at a moment indicated by starting time information included in the state-switching request after receiving the state-switching request.

6. The method according to claim 5, wherein the acquiring information that the base station schedules the RN through the R-PDCCH comprises:
    acquiring, by the RN, the information that the base station schedules the RN through the R-PDCCH when receiving the state-switching request response message from the base station.

7. The method according to claim 1, wherein the acquiring information that the base station schedules the RN through the R-PDCCH comprises:
    acquiring, by the RN, the information that the base station schedules the RN through the R-PDCCH when receiving part or all relay function configuration parameters from the base station.

8. The method according to claim 7, further comprising:
    scheduling, by the base station, the RN through the R-PDCCH after sending the relay function configuration parameters to the RN.

9. The method according to claim 8, wherein the relay function configuration parameters include one or more of the following parameters:
    R-PDCCH configuration information, Relay-node Physical Downlink Shared Channel (R-PDSCH) configuration information, Relay-node Physical Uplink Shared Channel (R-PUSCH) configuration information, dedicated scheduling request configuration information for the RN, subframe information for scheduling the RN, and RN identity.

10. The method according to claim 7, wherein the relay function configuration parameters include one or more of the following parameters:
    R-PDCCH configuration information, Relay-node Physical Downlink Shared Channel (R-PDSCH) configuration information, Relay-node Physical Uplink Shared Channel (R-PUSCH) configuration information, dedicated scheduling request configuration information for the RN, subframe information for scheduling the RN, and RN identity.

11. The method according to claim 1, further comprising:
monitoring, by the RN, PDCCH information from the base station when the RN is in the connection state of serving as a UE.

12. The method according to claim 1, further comprising:
monitoring, by the RN, R-PDCCH information from the base station when the RN is in the connection state of enabling a relay function.

13. A system for managing a state of a Relay Node (RN), comprising a base station and an RN, wherein
the RN is configured to switch from a connection state of serving as a UE to a connection state of enabling a relay function, after acquiring information that the base station schedules the RN through a Relay-node Physical Downlink Control Channel (R-PDCCH), or after sending the base station a state-switching request of requiring to switch to the connection state of enabling a relay function;
wherein, the connection state of serving as a UE is a state in which the RN has no relay function; and
the connection state of enabling a relay function is a state in which the RN has a relay function and provides services for a UE within a covering area of the RN.

14. The system according to claim 13, wherein
the base station is configured to take a moment of acquiring that the RN switches to the connection state of serving as a UE as an initial point, and, after a time period set by a system or a default time period, schedule the RN through the R-PDCCH, and
the RN is further configured to automatically detect the R-PDCCH, and acquire the information that the base station schedules the RN through the R-PDCCH when R-PDCCH information from the base station to the RN is detected.

15. The system according to claim 13, wherein the base station is configured to:
after receiving the state-switching request from the RN, schedule the RN through the R-PDCCH, or,
after receiving the state-switching request from the RN, schedule the RN through the R-PDCCH and return a state-switching request response message to the RN, or,
after receiving the state-switching request and returning a state-switching request response message to the RN, schedule the RN through the R-PDCCH, or;
parse the received state-switching request to acquire starting time information from, and schedule the RN through the R-PDCCH at a moment indicated by the starting time information, and return a state-switching request response message to the RN after starting to schedule the RN through the R-PDCCH; and
the RN is further configured to:
include starting time information in the state-switching request sent to the base station, which indicates a moment at which the base station schedules the RN through the R-PDCCH, or
acquire that the base station schedules the RN through the R-PDCCH when receiving the state-switching request response message.

16. The system according to claim 13, wherein
the base station is configured to schedule the RN through the R-PDCCH after sending relay function configuration parameters to the RN; and
the RN is further configured to acquire the information that the base station schedules the RN through the R-PDCCH when receiving part or all of the relay function configuration parameters from the base station.

* * * * *